United States Patent Office 3,046,284
Patented July 24, 1962

3,046,284
BISNAPHTHENATE HETEROCYCLIC ESTERS
John O. Van Hook, Abington, Pa., assignor to Rohm & Haas Company, Philadelphia, Pa., a corporation of Delaware
No Drawing. Filed Aug. 12, 1959, Ser. No. 833,160
4 Claims. (Cl. 260—347.4)

This invention relates to new compounds of the formula

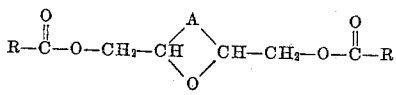

where A is an alkylene chain containing two to three carbon atoms, R represents a naphthenic acid residue containing from about eight to thirty carbon atoms, the lower range, from about eight to twelve carbon atoms, comprising predominantly monocyclic acids, and the upper range, from about twelve to thirty carbon atoms comprising a major portion of polycyclic naphthenic acids. The bisnaphthenates of the invention are valuable plasticizers for polyvinyl halide resins.

The naphthenic acids that may be employed as primary materials for the preparation of the esters of the invention are extraction products of crude petroleum oils. Hence, generally, they are mixtures of naphthenic acids, of varying degree of purity, that may contain an average of eight to thirty carbon atoms, including fractional values for carbon atom contents in that range. The preferred heterocyclic esters of the invention have R residues of a value from ten to sixteen carbon atoms. The R residue may be alike or different. However, regardless of the particular weight of the R residues, what appears to give the compounds of the invention their plasticizing properties is the particular combination in one molecule of the tetrahydropyran or tetrahydrofuran structure with the naphthenic acid residues.

In a general manner, the heterocyclic esters of the invention may be prepared by reacting a naphthenic acid of the type described above with tetrahydrofurfuryl glycol or the corresponding pyran under conditions favoring esterification in the optional presence of an esterification catalyst. A water entrainer may be employed, if desired. The reaction temperatures preferably range from about 100° to 300° C. and after the theoretical amount of water has distilled off, the heterocyclic ester is collected. If desired, a purer product may be obtained by washing with dilute alkali and redistilling under reduced pressure. Typical operable esterification catalysts include organic and inorganic acids, such as toluene sulfonic acid, benzene sulfonic acid, alkane sulfonic acid, alkali metal hydrogen sulfate, hydrochloric acid, sulfuric acid; Lewis acids, such as zinc chloride, metallic zinc, boron fluoride, and the like.

Typical water-entrainers include hydrocarbons, like toluene, xylene, heptane, octane, kerosene, mixed aliphatic, aromatic, and cyclic solvents, such as mineral oil, and the like.

The heterocyclic esters of the invention are valuable plasticizers for polyvinyl halide resins. The term "polyvinyl halide resin" refers to polymers containing a predominant quantity, that is, a quantity greater than 50%, generally over 60%, by weight of the monomer as vinyl halide units. This includes the homopolymers of the vinyl halides as well as the copolymers and interpolymers prepared therefrom. Other monomers that may be copolymerized with the vinyl halide include the vinyl type monomers such as, for example, those having a single $CH_2=C-$ group, such as vinylidene chloride, vinyl chloroacetate, chlorostyrene, chlorobutadienes, etc., and those copolymers of such vinyl compounds and other unsaturated materials copolymerizable therewith, for example, copolymers of a vinyl halide, such as vinyl chloride, with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene; esters of $\alpha,\beta$-unsaturated carboxylic acids, for example, the methyl, ethyl, butyl, amyl, hexyl, octyl esters of maleic, crotonic, itaconic, fumaric acids and the like. Further useful copolymers are those obtained by copolymerization of vinyl chloride with an ester of an $\alpha,\beta$-unsaturated dicarboxylic acid, such as diethyl maleate or other esters of maleic, fumaric, aconitic, itaconic acid, etc., in which 5 to 20 parts by weight of diethyl maleate or other analogous esters are used for every 95 to 80 parts by weight of vinyl chloride.

The heterocyclic esters of the invention are particularly valuable because they soften polyvinyl halide resins while simultaneously imparting thereto very satisfactory stability at high temperature. The high degree of compatibility of the heterocyclic esters with the resin permits incorporation of large amounts of the compounds into the resin.

The following examples illustrate, without limiting, the preparation of the esters of the invention; all parts are given by weight.

EXAMPLE 1

Sixty-seven parts of tetrahydrofurfuryl glycol and 254 parts of naphthenic acid, having an average carbon content of 13.5, in 200 parts of toluene containing 20 parts of p-toluene sulfonic acid are heated under reflux (about 125° C.) under a Dean-Stark trap for two hours. 18.5 ml. of water is removed by azeotropic distillation. The residue is distilled removing toluene and the residue is dissolved in ether and washed with aqueous alcohol. The product is dried and then distilled at 212° C. under 0.2 ml. of pressure. One hundred eighty-four parts of 2,5-di(naphthenoxymethyl) tetrahydrofuran is collected. Its saponification number is 197.

Likewise, 2,5-di(naphthenoxymethyl) tetrahydropyran is obtained from the corresponding glycol.

EXAMPLE 2

The procedure of Example 1 is followed using naphthenic acid mixtures having an average carbon content of 11.5. After esterification has proceeded to completion, 2,5-di(naphthenoxymethyl) tetrahydrofuran is collected.

Likewise, other 2,5-di(naphthenoxymethyl) tetrahydrofuran samples are prepared from mixtures of naphthenic acid having an average carbon content of 15.5. The products are valuable plasticizers for polyvinyl halide resins.

When the heterocyclic esters of the invention are employed as plasticizers for polyvinyl halide resins, they are ordinarily incorporated into the vinyl halide polymers by mixing the powdered resin with the liquid plasticizer followed by mixing and/or kneading and then by curing the mix at an elevated temperature, for example, within the range from 150° to 200° C., on hot rolls or in a heated mixer, such as a Werner-Pfleiderer or Banbury mixer. The proportion of heterocyclic esters that may be employed may vary over a great range since it is dependent on the particular esters of this invention which is selected, the specific polyvinyl halide resin to be plasticized, and the final degree of plasticization desired in the resin, this factor in itself being dependent on the ultimate application intended for the resin. With these facts in mind, one skilled in the art may use the heterocyclic esters in a "plasticizing amount" for most purposes this being from about 5 to 100 parts, and more commonly from 20 to 60 parts, of heterocyclic esters per 100 parts of resin. In amounts exceeding 100 parts of heterocyclic ester per 100 parts of polyvinyl chloride resin, the esters of the invention are more commonly suitable for use in organosols and plastisols.

With the polyvinyl halide resin, there may be incorporated various stabilizers, fillers, dyes, pigments, and the like.

The value of the heterocyclic esters of the invention is further demonstrated by the following illustrations.

A standard resinous composition is made up from the following ingredients.

*Table I.—Standard Formulation*

| | Parts |
|---|---|
| Polyvinyl chloride | 60 |
| Plasticizer | 40 |
| Barium cadmium laureate | 1.0 |

2,5-di(naphthenoxymethyl) tetrahydrofuran is incorporated into the vinyl halide polymer by the procedure described above and the resulting supple films are subjected to the following standard evaluation tests, further described below. For purposes of comparison, samples of polyvinyl halide resins plasticized with di(2-ethylhexylphthalate), a commercially recognized plasticizer, are subjected to the same tests and the results are reported in Table II below.

TESTS

*Test 1.*—Shore hardness: A Shore "A" Durometer, under a weight of 3 pounds, is applied to the test specimens. A recording is made at once and after 10 seconds; and the hardness is expressed by the two values, of which the first recording is the higher.

*Test 2.*—Activated carbon volatility: 2" squares of weighed specimens are placed between 2-inch layers of activated carbon in sealed glass jars which are maintained at 90° C. for 24 hours. The specimens are removed, dusted free of carbon and reweighed.

*Test 3.*—Soapy water extraction: 3" squares of weighed specimens are immersed in a 1% aqueous solution of Ivory soap at 90° C. for 24 hours, after which they are thoroughly washed, dried, and reweighed.

*Test 4.*—Hexane extraction: Weighed samples are immersed in white, lead-free hexane at 25° C. for two hours, after which they are thoroughly dried and reweighed.

*Test 5.*—Compatibility. Weighed, conditioned duplicate samples, 4 inches by 4 inches by 0.010 inch, are placed between two sheets of cardboard, which have been conditioned at least 15 hours. The specimens are in contact with the white, coated side of the cardboard. The cardboard-specimen sandwiches are placed between 5 inches by 5 inches by 1 inch wood blocks under a 3-kilogram weight. After seven days, the specimens are removed from the stack, conditioned, and reweighed. Percent plasticizer loss is calculated. The cardboard sheets are examined qualitatively for evidence of plasticizer or plasticizing stabilizer stains.

The performance data of the polyvinyl chloride compositions are recorded in Table II. Except for the results of Test 1, which are expressed in units from 1 to 100, all other results are the amounts expressed as percentage loss of weight of the polyvinyl halide film.

*Table II.—Results of Performance Tests*

| Compounds | Tests | | | | |
|---|---|---|---|---|---|
| | 1 | 2 | 3 | 4 | 5 |
| Di-2-ethylhexylphthalate | 68 | 8.0 | 3.0 | 25.0 | 0.2 |
| 2,5-Di (naphthenoxymethyl) tetrahydrofuran | 87 | 1.8 | 4.4 | 25.0 | 0 |

The data show that this typical heterocyclic ester exhibits low volatility with concurrent other very satisfactory plasticizing properties.

The above formulations are modified by replacing polyvinyl chloride by copolymers of (A) 87 parts: vinyl chloride
13 parts: vinyl acetate
(B) 80 parts: vinyl chloride
20 parts: vinylidene chloride
(C) 80 parts: vinyl chloride
20 parts: methyl acrylate
(D) 95 parts: vinyl chloride
5 parts: vinyl isobutyl ether The resinous compositions are tested as described above. All compositions are supple and flexible, and they exhibit improved permanence over resinous compositions plasticized with di(2-ethylhexyl)phthalate.

I claim:

1. A compounnd of the formula

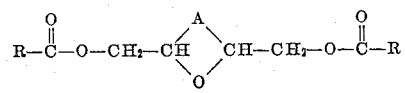

in which A is an alkylene chain of two to three carbon atoms, inclusive, and R represents a naphthenic acid residue containing from eight to thirty carbon atoms.

2. A compound of the formula

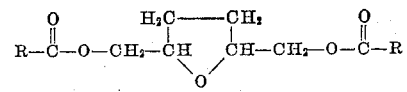

in which R is a naphthenic acid residue containing ten to sixteen carbon atoms.

3. A compound of the formula

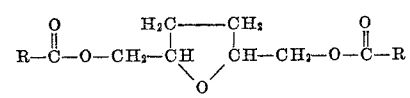

in which R is a naphthenic acid residue containing twelve to fourteen carbon atoms.

4. A compound of the formula

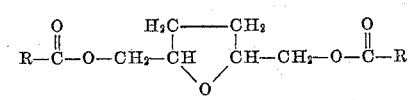

in which R is a naphthenic acid residue containing 13.5 carbon atoms.

References Cited in the file of this patent

UNITED STATES PATENTS

| 2,526,601 | Coes | Oct. 17, 1950 |
| 2,529,449 | Ham | Nov. 7, 1950 |
| 2,766,260 | Kartinos | Oct. 9, 1956 |
| 2,842,512 | Jezl | July 8, 1958 |
| 2,847,424 | Ward | Aug. 12, 1958 |
| 2,911,433 | Jolly | Nov. 3, 1959 |

OTHER REFERENCES

Rodd: Chemistry of Carbon Compounds, vol. IIA (1953), pages 114–15.